Oct. 7, 1924.

G. T. HOVEN 1,510,479

HAY LOADER

Filed April 13, 1923

Inventor
George T. Hoven
By his Attorney
James F. Williamson

Patented Oct. 7, 1924.

1,510,479

UNITED STATES PATENT OFFICE.

GEORGE T. HOVEN, OF BOYCEVILLE, WISCONSIN, ASSIGNOR OF ONE-FOURTH TO GUST PRICE, OF BOYCEVILLE, WISCONSIN, AND ONE-FOURTH TO GUSTAVE A. HOVEN, OF ZUMBRATA, MINNESOTA.

HAY LOADER.

Application filed April 13, 1923. Serial No. 631,813.

*To all whom it may concern:*

Be it known that I, GEORGE T. HOVEN, a citizen of the United States, residing at Boyceville, in the county of Dunn and State of Wisconsin, have invented certain new and useful Improvements in Hay Loaders; and I do hereby declare the following to be a full, clear, and exact description of the invention, such as will enable others skilled in the art to which it appertains to make and use the same.

This invention relates to a hay loading machine of the type adapted to carry the hay from the ground to deliver the same onto a wagon or load of hay thereon. The invention is particularly concerned with an extension for such a hay loader adapted to carry the elevated hay forward over the wagon, or an attachment for an ordinary hay loader comprising such an extension. As is well known to those skilled in the art, the hay loaders of the usual type elevate the hay and deliver the same to one end of the wagon where the hay is discharged. This hay must then be handled by forks in the hands of operators on the load and distributed to the proper position. It is thus seen that a great deal of handling of the hay is necessary and much of the same must be manually moved from one end of the wagon to the other.

It is an object of this invention, therefore, to provide a convenient means adapted to be attached to the elevator and elevator frame of the usual hay loader, which conveying means receives the hay from said elevator and conveys the same over the wagon a considerable distance before the hay is discharged.

It is a further object of the invention to provide such a conveyor carried in a frame swingingly mounted on a bracket attached to the elevator frame whereby the conveyor and its swinging frame may be moved to inoperative position.

It is a further object of the invention to provide a supporting means on the elevator frame for the extension conveyor having thereon a pair of alined pulleys over one of which runs a flexible member attached to the conveyor adapted to bring the same to operative or inoperative position and adapted to move from one pulley to the other when the conveyor is so swung.

Figure 1:
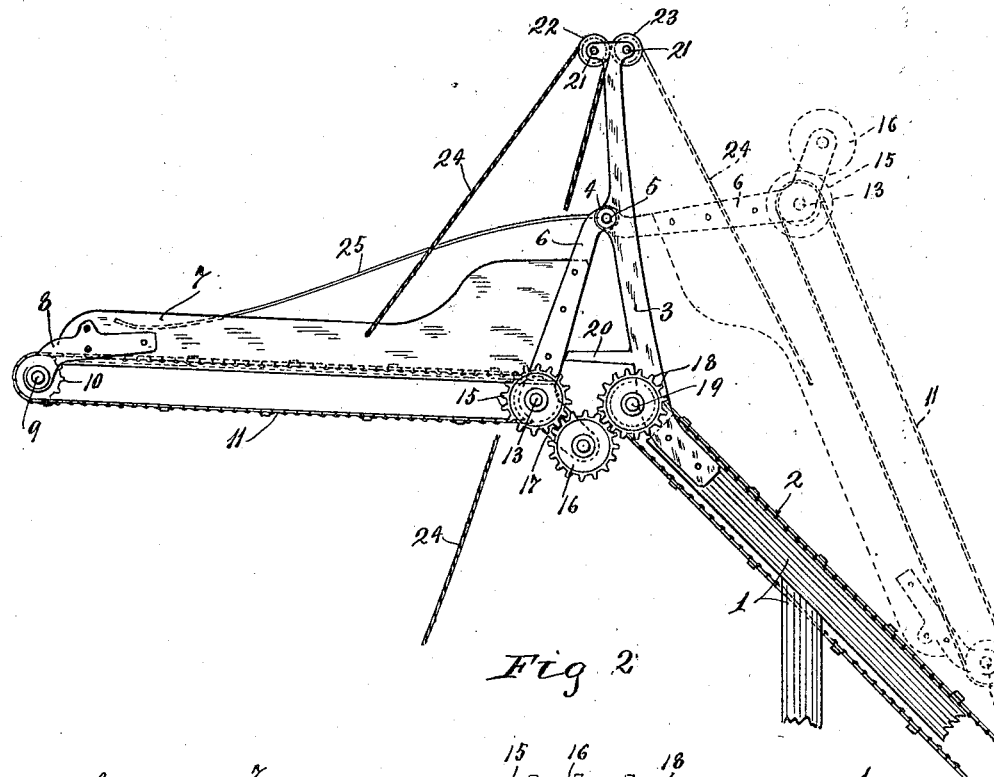
Figure 2:
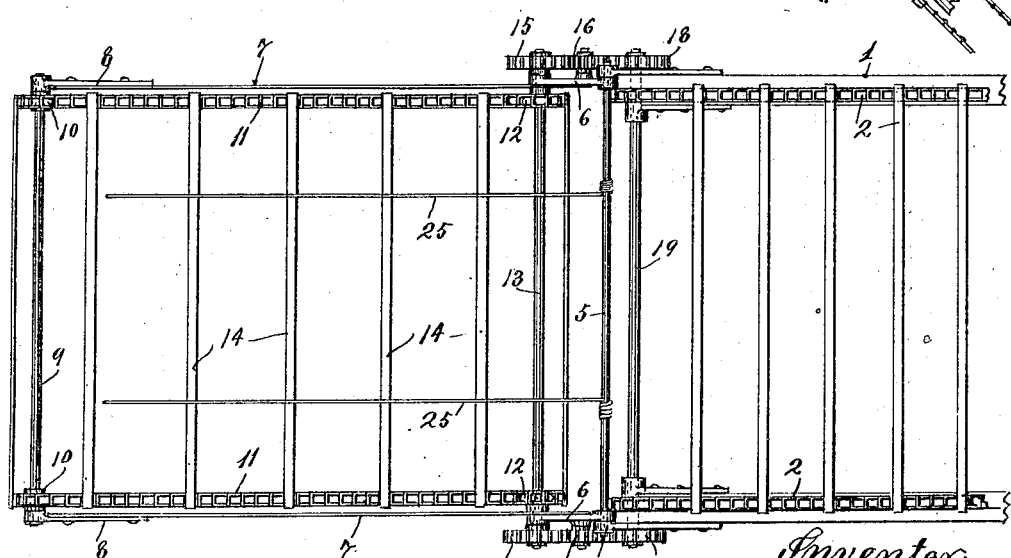

These and other objects and advantages of the invention will be fully set forth in the following description made in connection with the accompanying drawings in which like reference characters refer to the same parts throughout the different views, and in which, Fig. 1 is a view in side elevation of the device showing the same in inoperative position in dotted lines; and Fig. 2 is a plan view of the device.

Referring to the drawings, an elevator frame of the ordinary type of hay loader is illustrated as 1, which supports the endless carrier 2 which forms the elevator for the hay. In accordance with the present invention, the supporting brackets 3 are attached at each side of the frame 1 and extend upwardly therefrom, which brackets are provided with the lugs 4. A rod or shaft 5 extends through the lugs 4 of the brackets 3 to which rod are pivoted the arms 6 which have bearing lugs at their outer ends. The arms 6 are bolted or otherwise secured to side frame members 7 which have secured thereto at their outer ends by suitable bolts or other fastening means, brackets 8 provided with terminal lugs in which is journaled a shaft 9. Sprockets 10 are secured to the shaft 9 adjacent the arms 10 and the side frame members 7 and endless chains 11 travel over these sprockets and sprockets 12 secured to a shaft 13 which extends through and is journaled in lugs formed intermediately of the arms 6. Cross slats 14 are secured to the chains 11 at suitable intervals, whereby an endless conveyor is formed traveling between the side members 7. The conveyor comprising channels 11 preferably is arranged to be driven from the elevator 2 and while any suitable mechanism could be employed for this purpose, in the embodiment of the invention illustrated, the shaft 13 is arranged to extend beyond the arms 6 and has secured to its outer end spur gears 15 arranged to mesh with idler gears 16 journaled on stub shafts secured in lugs carried at the ends of extensions 17 of the arms 6. The gears 16, in turn, mesh with gears 18 secured to the ends of a shaft 19 which is the shaft at the top of the elevator 1 carrying sprockets over which the chains for conveyor 2 pass. The brackets 3 are provided with forwardly extending arms 20 with which the arms 6 are adapted to contact. The frame comprising members 6, 7 and 8 is thus held in correct position for the gears 16 properly to mesh with the gears 18. The brackets 3 are provided with portions extending beyond lugs 4 carrying transversely extending arms at their upper ends, in the outer portions of which are secured short shafts 21 carrying alined sheaves or pulleys 22 and 23. A rope or other suitable flexible member 24 is secured at its end intermediate of the side members 1 and when the conveyor is in operative position, as shown in full lines, passes over the pulley 22 and then passes downward to a point adjacent the ground. This rope can thus be pulled upon to lift the swinging frame carrying the conveyor comprising chains 11 so that the same can be swung upwardly. This swinging movement will disengage the gears 16 and 18 and the said swinging frame and conveyor carried thereby, if desired, can be swung entirely over to the other side of the brackets 3, as indicated by dotted lines in Fig. 1, where it will be disposed in convenient position for transportation of the hay loader. When the said frame swings to the other side of the brackets 3 the flexible member or rope 24 swings over and lies upon the pulleys 23. It is obvious that the conveyor and its swinging frame can be easily swung back to operative position by again pulling upon the rope 24. Flexible rods 25 are provided with helical coils at one end embracing the rod 5 and extended outwardly from this rod downwardly and over the conveyor comprising members 11 and 14 being somewhat up-curved at their outer ends.

When the hay loader is to be used the same will be moved to the desired location with the extension conveyor in the position indicated by dotted lines in Fig. 1. When the hay loader is operated its extension conveyor will be swung to its full line position, as shown in Fig. 1, by manipulation of the rope 24. The arms 6 will then contact the arms 20 and the gears 16 and 18 will be placed in engagement. When the hay loader now is operated and the elevator 2 moved, the gear 18 will drive the gear 15 through the idler gear 16 so that the top run of the chains 11 will be progressed outwardly. The hay elevated by the carrier 2 will be discharged from the top thereof onto the top run of the conveyor comprising members 11 and 14 and this hay will thus be carried over the wagon or load and deposited at an intermediate point thereof. The hay will be held down in contact with the slats 14 and prevented from piling up objectionably on the conveyor by the members 25, which members are yielding and will give somewhat, if necessary. The hay is thus carried forwardly of the wagon or over the same in any other desired direction without manual labor and a great deal of manual handling of the hay which has heretofore been necessary is eliminated. The load can be more conveniently constructed and the hay handled with much less labor.

From the above description it is seen that applicant has invented a very simple and efficient extension or extension attachment for a hay loader and one which will have great utility for the purpose intended. The device can readily be attached to the standard or ordinary types of hay loaders and comprises comparatively few parts.

It will, of course, be understood, that various changes may be made in the form, details and arrangement of the parts without departing from the scope of applicant's invention, which generally stated, consists in a device capable of carrying out the objects above enumerated and such as shown and described and set forth in the appended claims.

What is claimed is:

1. The combination with a hay loader and the elevator frame and elevator thereof, of an extension conveyor adapted to receive the hay discharged from said elevator and to carry the same over and discharge the same on the load, brackets secured to said elevator frame, a frame carrying said extension conveyor swingingly connected to said brackets, a gear driven by said elevator, a gear on said extension conveyor for driving the same, a gear meshing with both of said gears and carried on said extension conveyor, and stop means on said brackets co-operating with said swinging frame to hold the conveyor and said first and last mentioned gears thereon in operative position, and means for swinging said frame and conveyor to an inoperative position and disengaging said first and last mentioned gears.

2. The combination with a hay loader comprising an upwardly extending frame having side members and a conveyor therebetween, of a bracket secured to each of said side members and extending upwardly therefrom, a frame having longitudinal side members, a conveyor mounted therebetween constituting an extension conveyor adapted to receive material from said first mentioned conveyor, brackets secured to and extending upwardly approximately at a right angle from one end of said longitudinal side members and pivotally connected at their upper ends, respectively to said first mentioned brackets, one of said first mentioned brackets having an upwardly projecting extension, a pair of alined pulleys closely adjacent each other journaled in said extension, a rope passing between said pulleys connected at one end to said last mentioned frame and adapted to be pulled at its other end, said rope moving over one of said pulleys when said extension conveyor is in operative position, and over the other of said pulleys when said extension conveyor is swung on its brackets to inoperative position, a gear carried by one of said first mentioned brackets, a pair of meshing gears carried by one of said last mentioned brackets, one of which forms an idler and is adapted to be moved into and out of meshing relation with said first mentioned gear, when said extension conveyor is moved to operative and inoperative positions respectively.

3. The combination with a hay loader, the elevator and elevator frame thereof, of arms extending upwardly and outwardly at the sides of said elevator frames at the top thereof, an extension conveyor frame, arms extending upwardly and inwardly from the sides of said latter frame at the inner end thereof, a shaft connecting the arms on said frames and forming a pivot connection between said frames, and a plurality of yielding rods secured to said shaft extending outwardly and downwardly over said extension conveyor and having their outer ends in close proximity thereto and curved slightly upwardly.

4. The combination with a hay loader, the elevator and elevator frame thereof, of brackets extending upwardly and outwardly at the sides of said elevator frame at the top thereof, an extension conveyor frame, an endless conveyor mounted thereon, brackets extending upwardly and inwardly from the sides of said latter frame at the inner end thereof, a shaft connecting the brackets on said frames and forming a pivot connection between said frames, said arms projecting upwardly from said brackets on said elevator, means carried by said arms for swinging said extension conveyor frame and driving means for said endless conveyor including meshing gears carried by said brackets, said driving means being moved to operative and inoperative position with said extension conveyor frame over said elevator frame.

5. The combination with a hay loader comprising an upwardly extending frame having side members and a conveyor therebetween, of a bracket secured to each of said side members and extending upwardly therefrom, a frame having longitudinal side members, a conveyor mounted therebetween constituting an extension conveyor adapted to receive material from said first mentioned conveyor, brackets secured to and extending approximately at a right angle from one end of said longitudinal side members and pivotally connected, respectively to said first mentioned brackets, said last mentioned brackets having downwardly extending arms, inner and outer shafts journaled in said arms having meshing gears at their ends, said inner shaft forming the driving shaft for said extension conveyor, said first mentioned brackets having a shaft extending therebetween carrying gears meshing with the gears on said outer shaft, said first mentioned brackets having outwardly projecting arms adapted to engage said last mentioned brackets for holding said last mentioned gears in proper meshing position, said extension conveyor being adapted to be swung over said first mentioned frame and conveyor to separate said last mentioned gears.

In testimony whereof I affix my signature.

GEORGE T. HOVEN.